US008180854B2

(12) United States Patent
Schneider

(10) Patent No.: US 8,180,854 B2
(45) Date of Patent: May 15, 2012

(54) ASPECT SERVICES

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 390 days.

(21) Appl. No.: 12/129,670

(22) Filed: May 29, 2008

(65) Prior Publication Data

US 2009/0300099 A1 Dec. 3, 2009

(51) Int. Cl.
*G06F 15/16* (2006.01)
(52) U.S. Cl. ........................................ 709/218
(58) Field of Classification Search .................. 709/218
See application file for complete search history.

(56) References Cited

U.S. PATENT DOCUMENTS

| | | | |
|---|---|---|---|
| 6,163,844 A | 12/2000 | Duncan et al. | |
| 6,321,267 B1 | 11/2001 | Donaldson | |
| 6,467,086 B1 | 10/2002 | Kiczales et al. | |
| 6,473,895 B1 | 10/2002 | Lopes et al. | |
| 6,539,390 B1 | 3/2003 | Kiczales et al. | |
| 6,571,295 B1 | 5/2003 | Sidana | |
| 6,591,266 B1 | 7/2003 | Li et al. | |
| 7,140,007 B2 | 11/2006 | Lamping | |
| 2002/0087661 A1 | 7/2002 | Matichuk et al. | |
| 2002/0138589 A1 | 9/2002 | Al-Kazily et al. | |
| 2003/0014628 A1 | 1/2003 | Freed et al. | |
| 2005/0091374 A1* | 4/2005 | Ganesan et al. | 709/225 |
| 2006/0026286 A1 | 2/2006 | Lei et al. | |
| 2006/0080546 A1 | 4/2006 | Brannon et al. | |
| 2006/0129880 A1* | 6/2006 | Arcese et al. | 714/11 |
| 2006/0168199 A1* | 7/2006 | Chagoly et al. | 709/224 |
| 2006/0288091 A1 | 12/2006 | Oh et al. | |
| 2007/0022141 A1 | 1/2007 | Singleton et al. | |
| 2007/0022409 A1* | 1/2007 | Levenshteyn | 717/136 |
| 2008/0034372 A1* | 2/2008 | Ganesan et al. | 719/311 |
| 2008/0235352 A1 | 9/2008 | Yolleck et al. | |
| 2009/0019133 A1 | 1/2009 | Brimley | |
| 2009/0158244 A1* | 6/2009 | Foumani | 717/105 |
| 2009/0171733 A1 | 7/2009 | Bobak et al. | |

OTHER PUBLICATIONS

Navarro, L. D., Südholt, M., Vanderperren, W., De Fraine, B., and Suvée, D. 2006. Explicitly distributed AOP using AWED. In Proceedings of the 5th international Conference on Aspect-Oriented Software Development (Bonn, Germany, Mar. 20-24, 2006). AOSD '06. ACM, New York, NY, 51-62.*

Nishizawa, M., Chiba, S., and Tatsubori, M. 2004. Remote pointcut: a language construct for distributed AOP. In Proceedings of the 3rd international Conference on Aspect-Oriented Software Development (Lancaster, UK, Mar. 22-24, 2004). AOSD '04. ACM, New York, NY, 7-15.*

Uwe Zdun, Tailorable language for behavioral composition and configuration of software components, Computer Languages, Systems & Structures, vol. 32, Issue 1, Apr. 2006, pp. 56-82.*

Largaisse, B and Joosen, W. "True and Transparent Distributed Composition of Aspect-Components". Middleware, 2006. pp. 42-61.*

Bart De Win, Viren Shah, Wouter Jossen, Ron Bodkins (eds.), Report of the workshop on AOSD Technology for Application-level Security (AOSDSEC), Report TW 387, Jun. 2005.*

(Continued)

*Primary Examiner* — Ajay Bhatia
(74) *Attorney, Agent, or Firm* — Lowenstein Sandler PC

(57) ABSTRACT

An aspect request associated with a web application is received by an aspect server, the web application being hosted by a web application server that is remote from the aspect server. Operations are performed according to the aspect request, the operations being associated with a crosscutting concern. A result is returned, the result supplementing functionality of the web application.

23 Claims, 8 Drawing Sheets

OTHER PUBLICATIONS

Greenwood, P., L. Blair, N. Loughran and A. Rashid. "Dynamic Framed Aspects for Dynamic Software Evolution". Workshop on Reflection, AOP and Meta-Data for Software Evolution (held with ECOOP 2004), Oslo, Norway.*
Office Action dated Jun. 19, 2009 for U.S. Appl. No. 11/804,683, filed May 18, 2007, 15 pages.
Hypertext Transfer Protocol—HTTP/1.1, The Secure Hypertext Transfer Protocol, Jun. 1999, 114 pages.
HMAC: Keyed-Hashing for Message Authentication, Feb. 1997, 11 pages.
The Advanced Encryption Standard-Cipher-based Message Authentication Code-Pseudo-Random Function-128, Aug. 2006, 7 pages.
HTTP Over TLS, May 2000, 7 pages.
The Transport Layer Security (TLS) Protocol Version 1.1, Apr. 2006, 82 pages.
HTTP Authentication: Basic and Digest Access Authentication, Jun. 1999, 32 pages.
Hypertext Transfer Protocol (HTTP) Digest Authentication Using Authentication and Key Agreement (AKA) Version-2, Nov. 2005, 13 pages.
Advisory Action for U.S. Appl. No. 11/804,683 mailed Jan. 27, 2010.
Notice of Allowance dated Sep. 17, 2010 for U.S. Appl. No. 12/129,584.
Office Action for U.S. Appl. No. 11/804,683, mailed Nov. 16, 2009.
Office Action for U.S. Appl. No. 12/129,584, mailed Apr. 16, 2010.
Office Action for U.S. Appl. No. 12/129,584, mailed Feb. 5, 2010.

* cited by examiner

ASPECT SERVICES

RELATED APPLICATIONS

This application cross-references U.S. patent application Ser. No. 12/129,668, filed on May 29, 2008 and entitled RULES ENGINE FOR ASPECT SERVICES. This application also cross-references U.S. patent application Ser. No. 12/129,584, filed on May 29, 2008 and entitled USING DISTRIBUTED ASPECTS TO REORDER ONLINE APPLICATION WORKFLOWS.

TECHNICAL FIELD

Embodiments of the present invention relate to aspect oriented software development, and more specifically to applying aspects in a distributed fashion across execution contexts.

BACKGROUND

Modern computer programs are typically created using modular programming approaches in which the various functions of a computer program are divided into interdependent modules. Each module is a component of a program that performs a specific set of related behaviors. Examples of such modular programming approaches include object oriented programming (e.g., Java, C++, etc.), where programs are structured as collections of interrelated objects, and functional programming (e.g., Mathematica, Extensible Stylesheet Language Transformations (XSLT), etc.), where programs are structured as collections of mathematical functions.

Modular programming approaches are adept at modularizing design features that can be cleanly divided. However, design features that cannot be cleanly divided (e.g., where the same or similar functionality affects multiple different concerns) cannot typically be modularized. These design features are said to be crosscutting concerns, and occur when a concern depends on and/or must affect parts of the implementation of several distinct modules. A concern is a set of behaviors needed to perform a specific feature of a computer program, which has been implemented in a code structure. Concerns can be divided into core concerns and crosscutting concerns. A core concern is a concern that performs operations that relate to the main domain, or responsibility, of a module. These operations may be referred to as core operations. Core concerns are often referred to as business concerns. A crosscutting concern is a concern that spans multiple modules (e.g., that cannot be completely separated from other concerns). A crosscutting concern typically affects multiple core concerns. Examples of crosscutting concerns include security, data logging, session management, authentication, etc.

Implementing crosscutting concerns in traditional programming languages typically requires the same or similar bits of code throughout the program, resulting in code that is tangled and/or scattered. For example, by its nature a security concern cuts across, and must be uniformly applied to, many of the natural units of modularity of a computer program. Because the security concern cuts across multiple modules, it isn't reusable, can't be refined or inherited, and is spread throughout the program in an undisciplined manner.

Aspect oriented programming (AOP) is a programming approach that was developed to address the limited manageability of crosscutting concerns in conventional programming approaches. An aspect includes a concern that crosscuts the primary modularization of a program. An aspect oriented programming language encapsulates crosscutting concerns in a number of special purpose program modules called aspects, rather than spreading the implementation of such concerns throughout the modules that include core concerns of a program. An aspect is the unit of modularity for crosscutting concerns, and includes a pointcut and advice. A pointcut is program code that picks out certain join points (a clearly definable point in a program flow, examples of which include method calls, exception throws, etc.) and values at those points. Advice is code (e.g., one or more operations) that can be executed when a join point is reached. Advice can define crosscutting functionality that transparently forces a modification to a core concern or adds additional functionality to a core concern. Advice is divided into before advice and after advice. Before advice is advice that runs as a join point is reached, before the program proceeds with the join point. After advice is advice that runs after the program proceeds with the join point.

Aspects can be applied to modules in well defined ways. For example, an aspect applied to a program constructed using an object oriented approach can affect the implementation of several classes (or several methods within a single class) in a clean, principled manner.

In conventional aspect oriented approaches, aspect code must be collocated with standard (non-aspect) code on a computer system. Therefore, if multiple networked computing systems implement the same aspect, they must each include a separate local instance of the same aspect code. Current aspect oriented programming languages also require that the aspect code and the standard code be compiled together. If the aspect code is not compiled together with the standard code, the aspects cannot typically be applied to core concerns of a compiled program. This can slow down the development and/or implementation of computer programs.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
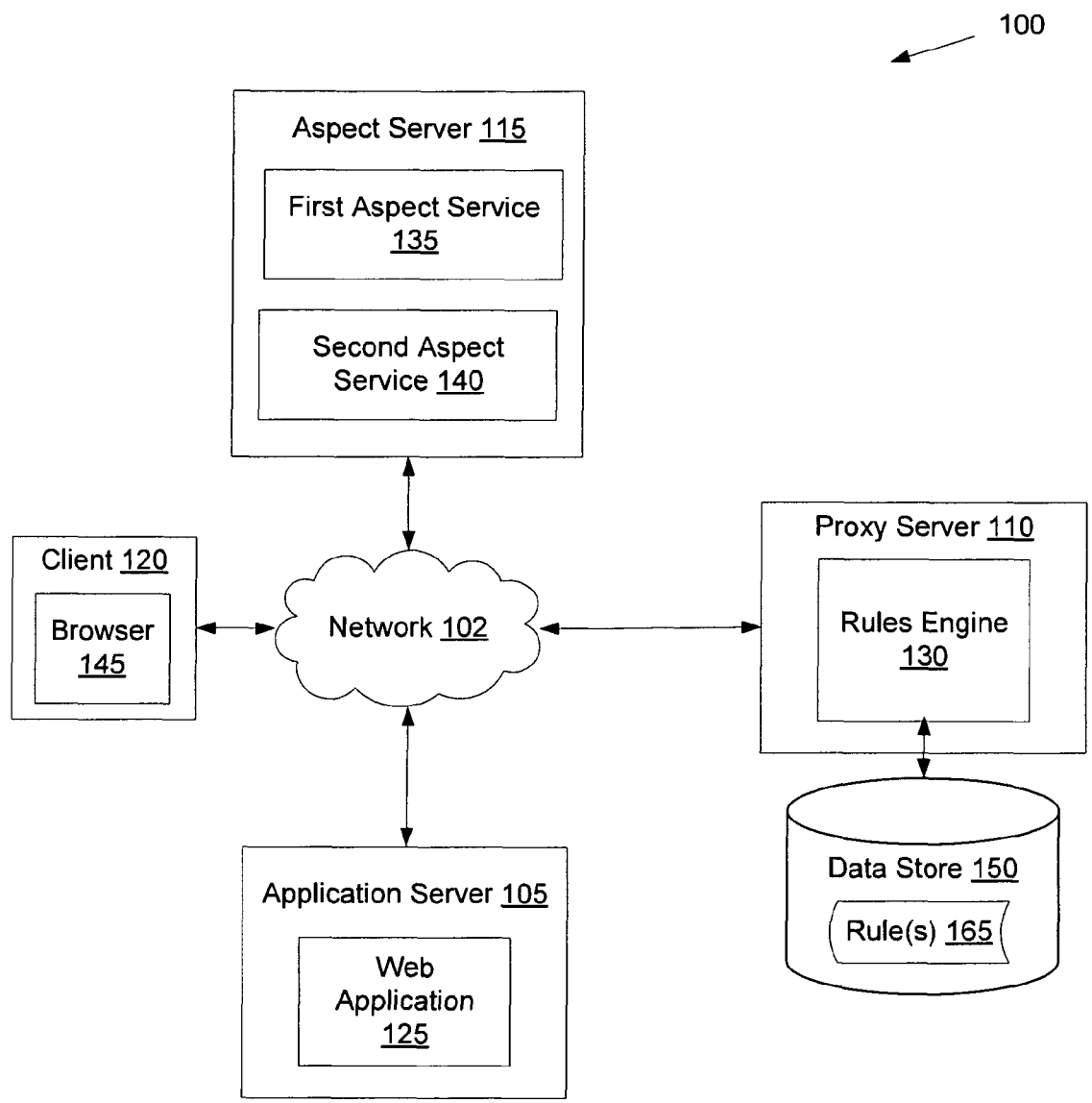
FIG. 1 illustrates an exemplary network architecture in which embodiments of the present invention may operate.

Described herein is a method and system for providing aspect services. In one embodiment, an aspect server receives an aspect request associated with a web application. The web application may be hosted by a web application server that is remote from the aspect server. The aspect request may be received from a proxy server, from a client, or from a web application server. Operations are performed according to the aspect request, wherein the operations are associated with a crosscutting concern. The operations are performed by an aspect service that is hosted by the aspect server. A result is then returned that supplements functionality of the web application.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing", "forwarding", "receiving", "performing", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable storage medium having stored thereon instructions, which may be used to program a computer system (or other electronic devices) to perform a process according to the present invention. A machine-readable storage medium includes any mechanism for storing or transmitting information in a form readable by a machine (e.g., a computer). For example, a machine-readable (e.g., computer-readable) storage medium includes read only memory ("ROM"), random access memory ("RAM"), magnetic disk storage media, optical storage media, and flash memory devices, etc.

FIG. 1 illustrates an exemplary network architecture 100 in which embodiments of the present invention may operate. The network architecture 100 may include a application server 105, a proxy server 110, an aspect server 115, and a client 120 connected via a network 102, which may be a private network (e.g., a local area network (LAN), wide area network (WAN), intranet, etc.) or a public network (e.g., the internet).

Client 120 may be a computing device such as, for example, a desktop computer, laptop computer, server, cellular phone, personal digital assistant (PDA), etc. In one embodiment, client 120 includes a browser 145 (e.g., a web browser) that enables client 120 to access information maintained by, and use services provided by, application server 105, proxy server 110 and/or aspect server 115. Browser 145 is an application that enables client 120 to display and interact with text, images, and other information provided by servers. Browser 145 may be a web browser configured to display web pages (e.g., by using hypertext transfer protocol (HTTP), extended markup language (XML), javascript, etc.). In an alternative embodiment, client 120 initiates service requests without use of a browser 145.

Application server 105 provides one or more services (e.g., database services, systems management services, network monitoring services, transactional services, webpage viewing services, etc.) to client 120. Application server 105 may be a front end server (e.g., that provides an interface to client 120) and/or a back end server. Through the application server 105, users of client 120 may request data, initiate actions, receive information, etc. via service requests.

In one embodiment, application server 105 is a web application server, and includes a web application 125 that provides services and/or information to client 120. Such services may include, for example, online retail sales, webmail, online auctions, discussion boards, web logs (blogs), etc. Application server 105 may receive a service request from client 120 or proxy server 110. Based on the contents of the service request, application server 105 may determine that web application 125 should perform one or more actions, after which application server 105 may return a service response to the client 120 or proxy server 110. Though only a single web application 125 is shown, application server 105 may include multiple web applications 125 and/or other services.

The web application 125 may be configured to include one or more core concerns. The core concerns perform functions, referred to as core operations, that relate to the main domain or responsibility of the web application 125. In one embodiment, the web application 125 is configured to only perform functions that relate to core concerns. In such an embodiment, crosscutting concerns are not included in the web application 125. Alternatively, some cross cutting concerns may be included in the web application, while others are not included. In an example, if the web application 125 provides a web log (blog), the web application 125 may only include functionality for posting to and displaying the blog, both of which are core concerns of the blog. Additional functionality such as authentication, security, and so on, which are not core concerns of the blog, may not be included in the web application 125. This can simplify the programming, upgrading, maintenance, etc. of the web application 125 by reducing the amount of instructions (e.g., coding) that it includes. This can also simplify coding, upgrading, maintenance, etc. of aspect services that include the crosscutting concern (described in greater detail below). For example, rather than performing the same upgrade to multiple different systems that include the same aspect, only a single aspect service that is used by multiple different applications may be upgraded.

Aspect server 115 is a server that provides specialized services known as aspect services. In one embodiment, aspect server 115 includes a single aspect service (e.g., first aspect service 135). Alternatively, aspect server 115 may include multiple aspect services (e.g., first aspect service 135 and second aspect service 140). Additional aspect servers (not shown) may also be connected with network 102 to provide additional aspect services. In one embodiment, aspect server 115 acts as a before advice handler. In such an embodiment, all aspect services hosted by the aspect server 115 therefore perform operations of a crosscutting concern before the web application 125 performs operations of a core concerns. Examples of such aspect services include authentication services, security services, etc. In another embodiment, aspect server 115 acts as an after advice handler. In such an embodiment all aspect services hosted by the aspect server 115 perform operations of a crosscutting concern after the web application 125 completes operations of a core concern. Examples of such aspect services include web page altering services, censoring services, etc.

An aspect service 135, 140 is an aspect that is remote from an application (e.g., web application 125) whose functionality is supplemented by the aspect (e.g., the functionality of the crosscutting concern provided by the aspect is added to the functionality of the application). Each aspect service 135, 140 can be accessed over network 102, and executed on aspect server 115. Aspect server 115 provides the aspect services 135, 140 to web application 125 and/or additional web applications (not shown) that are hosted by application server 105 or additional application servers (not shown).

Aspect services 135, 140 may be requested by a web application 125, or initiated based on service requests and or service responses. A request for an aspect service is herein referred to as an aspect request. A result generated by an aspect service in response to an aspect request is referred to here in as an aspect response. In one embodiment, aspect requests are generated by application server 105 (e.g., by web application 125). In another embodiment, aspect requests are generated by proxy server 110.

Each aspect service 135, 140 can add functionality of a distinct crosscutting concern to web application 125. Examples of aspect services include services that provide authentication, logging, security, session management, web page reformatting, content filtering, database transactions, etc. For example, first aspect service 135 may provide authentication functionality to web application 125, and second aspect service 140 may provide session management functionality to web application 125. Aspect services 135, 140 allow for programs that rely on specific crosscutting concerns (e.g., authentication, security, etc.) to be designed and written independently of an underlying authentication, security, or other crosscutting behavior. For example, web application 125 may not have certain crosscutting capabilities, and instead may rely on aspect services 135, 140 to provide such capabilities.

Once aspect requests are processed by aspect services 135, 140, the aspect services 135, 140 generate aspect responses. The aspect responses may then be sent back to the machine (e.g., server or client) and/or application (e.g., web application 125) from which an aspect request was received. Alternatively, the aspect response may be sent to a machine and/or application that is different than a machine and/or application from which the aspect request was received. For example, the aspect request may be received from proxy server 110, and the aspect response may be sent to client 120.

Some aspect services require additional information to be able to complete the operations of a specified crosscutting concern. When additional information is needed, the aspect service may include a request for information in the aspect response. Upon receipt of the requested information the aspect service may generate a new aspect response, and send it to an appropriate machine and/or application.

Proxy server 110 is a server that can intercept service requests that are directed to web application 125. Proxy server 110 can then forward the service requests to appropriate servers (e.g., application server 105 or aspect server 110), aspect services and/or applications. Alternatively, requests for specific resources and/or services offered by web application 125 may be directed to proxy server 110. Proxy server 110 may then determine an appropriate destination for the received requests. In one embodiment, proxy server 110 receives messages directed to different web application servers, and forwards the messages to appropriate web application servers and/or aspect servers.

In one embodiment, proxy server 110 generates aspect requests upon receiving service requests and or upon receiving service responses. The aspect requests may then be sent to aspect server 115. In one embodiment, aspect requests include the service request or service response. After sending an aspect request to aspect server 115, proxy server 110 may wait for a response. If an aspect response is received, proxy server 110 forwards the aspect response to the client 120 and/or application server 105. In one embodiment, if the aspect response is a null response, proxy server 110 forwards the service request to application server 105.

In one embodiment, proxy server 110 includes a rules engine 130, and is connected to a data store 150 that stores one or more rules 165. Data store 150 may include one or more storage devices that are local to proxy server 110 and/or remote from proxy server 110. The data store 150 may manage data via a file system, database, or other data management configuration.

A rule 165 is an abstract structure that describes a formal language precisely (e.g., a set of rules that mathematically delineates a (usually infinite) set of finite-length strings over a (usually finite) alphabet). Rules 165 may perform actions, provide information, help process messages, etc. A rule 165 may include conditional elements (e.g., and, or, not, exists, etc.), constraints (e.g., equal to, not equal to, greater than, contains, etc.) and consequences or actions (e.g., decrypt message, process next rule, forward message to aspect server, forward message to application server, initiate an aspect service, etc.). In one embodiment, a rule 165 dictates an aspect service to initiate.

In another embodiment, a rule 165 causes an aspect request to be generated and sent to aspect server 115. The aspect request includes instructions to initiate a specific aspect service. The rule 165 may also cause a received service request to be forwarded to aspect server 115. Rule 165 may also perform other functions.

In one embodiment, each rule 165 includes a pointcut that identifies when an aspect service should be initiated. Each rule 165 may further be associated with a specific aspect service. If the pointcut indicates that the aspect service is to be initiated upon receipt of a service request, then the aspect service can provide before advice. If the pointcut indicates that the aspect service is to be initiated upon receipt of a service response, then the aspect service can provide after advice. In another embodiment, at least one rule causes a service request or service response to be forwarded on to its intended recipient, and is not associated with an aspect service.

Rules engine 130 may be a logic component that processes rules 165 to produce outcomes. The rules engine 130 may match facts, data and rules 165, and infer conclusions which may result in actions or events. In one embodiment, the rules engine is a pattern matching rules engine. The rules engine 130 may match the facts, data and rules 165 using, for example, a Rete Algorithm, a Linear Algorithm, a Treat Algorithm, a Leaps Algorithm, etc. Hybrid algorithms that use combinations of, for example, the Leaps Algorithm and the Rete Algorithm, may also be used.

The rules engine 130 may use rules 165 to determine whether to initiate specified aspect services 115 whenever an incoming message (e.g., a service request) or outgoing message (e.g., a service response) is received. Such decisions may be made based on message contents (e.g., message header, message context, message body, URLs, portions of a web page being transmitted, etc.). For example, a first rule may specify that a client from which a service request is received must be authenticated before the service request will be sent on to application server 105. The first rule may further specify that the service request is to be forwarded to aspect server 115, and that first aspect service 135 is to be initiated to authenticate the client 120. Once the client has become authenticated, the rules engine 130 may apply a rule 165 that passes on service requests from the client 120 to their destination (e.g., to web application 125).

In one embodiment, rules 165 used by rules engine 130 are scripted. Alternatively, such rules 165 may be compiled. Moreover, aspect services may also be scripted or compiled. This can enable new rules and/or aspect services to be added, and existing rules and/or aspect services to be modified without requiring compiling. This can reduce the time required to develop applications, can provide fast prototyping, and can provide enhanced flexibility.

In one embodiment, the functions of the aspect server 115 and the proxy server 110 are combined. In such an embodiment, the rules engine 130 may determine whether any aspect services should be initiated. Such aspect services may then be automatically initiated without the need to send any messages to a remote server.

In another embodiment, the rules engine 130 is included in the aspect server 115, and not in the proxy server 110. In such an embodiment, the proxy server 110 may be configured to forward incoming and outgoing messages to the aspect server 115. The aspect server 115 may then use the rules engine 130 to determine whether to initiate any aspect services before sending the message back to proxy server 110, application server 105, or client 120. Alternatively, the rules engine may be included in an additional server (not shown).

In yet another embodiment, both proxy server 110 and aspect server 115 may include a rules engine. After receiving an aspect request, the aspect server 115 may compare the aspect request to a set of rules using the rules engine. If the aspect request matches a criterion or criteria specified in a rule, the aspect server 115 may generate an additional aspect request and send it to an additional aspect server. The additional aspect server may also include a rules engine, and may generate yet another aspect request and send it to yet another aspect server. In this manner, aspect services may be daisy chained, and some aspect services may initiate and/or depend on other aspect services. For example, a login service may be required to be initiated before a session management aspect service can be initiated.

In still another embodiment, the rules engine may be hosted by application server 105. The rules engine may examine incoming service requests and or outgoing service responses, and compare these messages to stored rules. If the criteria included in a rule are satisfied, an aspect request may be generated and sent from the application server 105 to the aspect server 115.

Figure 2A:
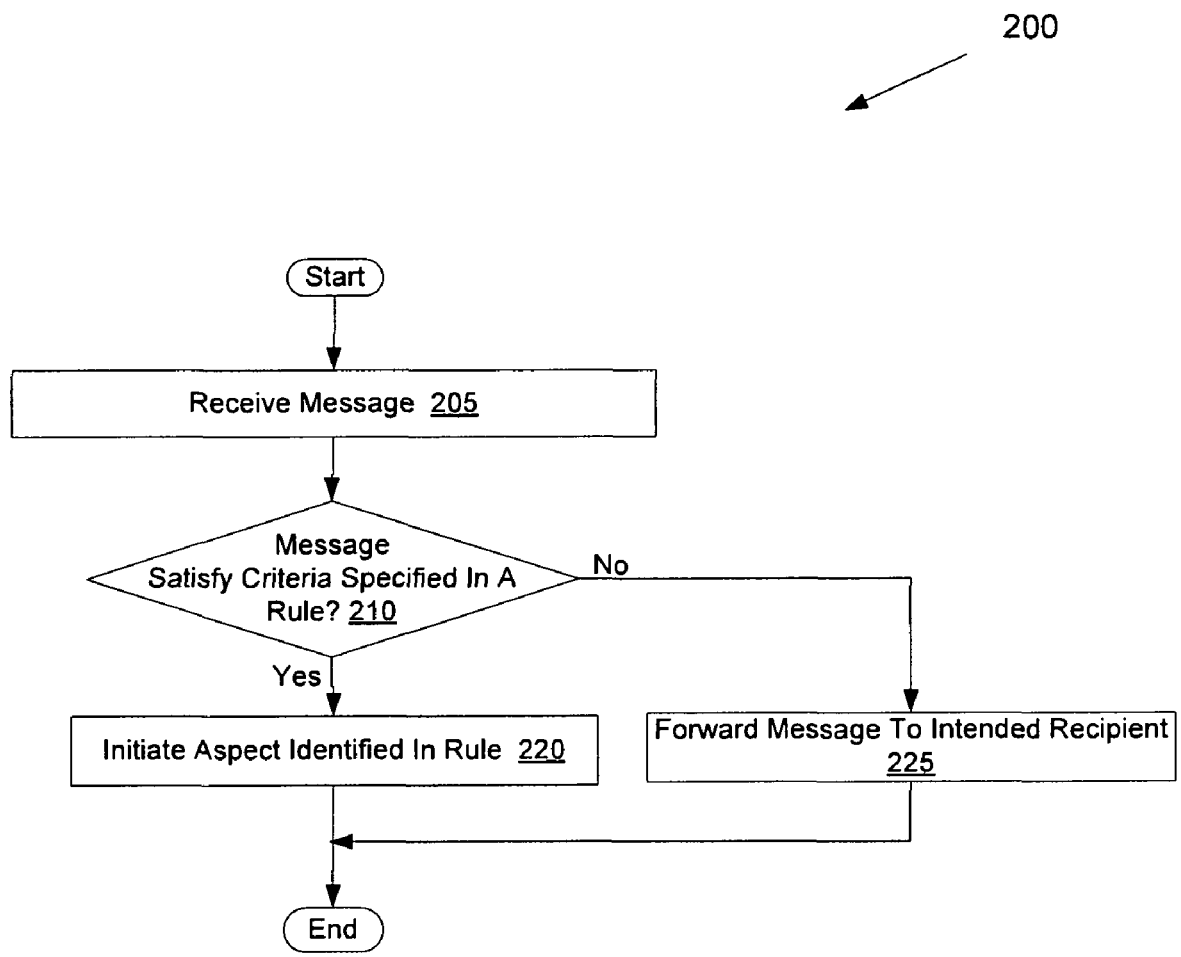
FIG. 2A is a flow diagram illustrating one embodiment of a method for providing aspect services.

FIG. 2A is a flow diagram illustrating one embodiment of a method 200 for providing aspect services. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 200 is performed by proxy server 110 and/or aspect server 115 of FIG. 1.

Referring to FIG. 2A, at block 205 of method 200 processing logic receives a message. The message may be a service request that has been generated by a client and that is addressed to a web application. The message may also be a service response that has been generated by a web application after the web application has completed one or more operation associated with the requested service. The message may be addressed to the client that generated the service request.

At block 210, processing logic compares the message to one or more rules using a rules engine. Each rule may include criteria that must be met before an action indicated by the rule is performed. In one embodiment, each rule is associated with a distinct web application. Alternatively, a single rule may be associated with multiple different web applications. In one embodiment, each rule identifies an aspect service that is to be initiated if the criteria specified in the rule are satisfied. If the criteria specified in a rule are satisfied, then the method proceeds to block 220. If the message does not match criteria specified in any rule, than the method proceeds to block 225.

At block 220, the aspect service identified by the rule is initiated. The aspect service may be, for example, an authentication service, a security service, a webpage formatting service, and so on. At block 225, processing logic forwards the message to an intended recipient (e.g., forwards a service request to a web application specified in a header of the request or a service response to a client specified in a header of the response). The method then ends.

Figure 2B:
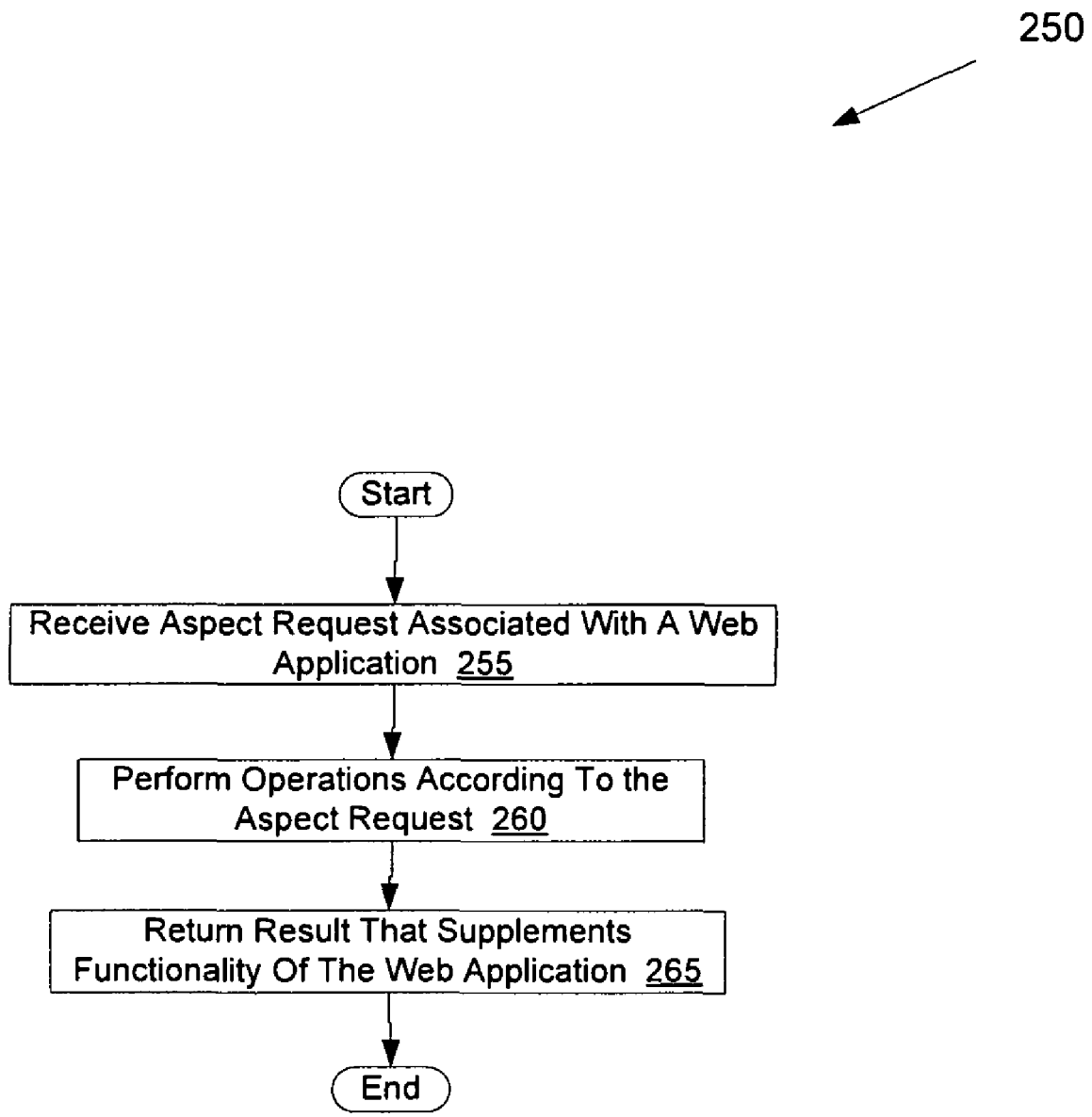
FIG. 2B is a flow diagram illustrating another embodiment of a method for providing aspect services.

FIG. 2B is a flow diagram illustrating another embodiment of a method 250 for providing aspect services. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 250 is performed by aspect server 115 of FIG. 1.

Referring to FIG. 2B, at block 255 of method 250 processing logic receives an aspect request associated with a web application. An aspect request is a service request that is directed to an aspect service. In one embodiment, the aspect request is received from a proxy server. The proxy server may send the aspect request to the aspect server along with a service request directed to the web application or a service response that was generated by the web application. In one embodiment, the web application associated with the aspect request is a web application to which a service request that caused the aspect request to be generated is addressed. In another embodiment, the web application associated with the aspect request is a web application that generated a service response that caused the aspect request to be created. In yet another embodiment, the aspect request is received from a web application, and is therefore associated with the web application.

At block 260, processing logic performs operations according to the aspect request. In one embodiment, the operations are performed by an aspect service. The aspect service may use information in the aspect request and/or an accompanying service request or service response to perform the operations. The operations performed by the aspect service are associated with a distinct crosscutting concern. For example, the aspect service may perform operations that authenticate a client, that log information associated with a transaction, etc.

At block 265, processing logic returns a result that supplements functionality of the web application. For example, if the web application is an online commerce application, the aspect service may supplement functionality of the web application by providing security, or by logging a transaction. This can leave the online commerce application to perform core concerns such as displaying wares and processing orders.

Figure 3A:
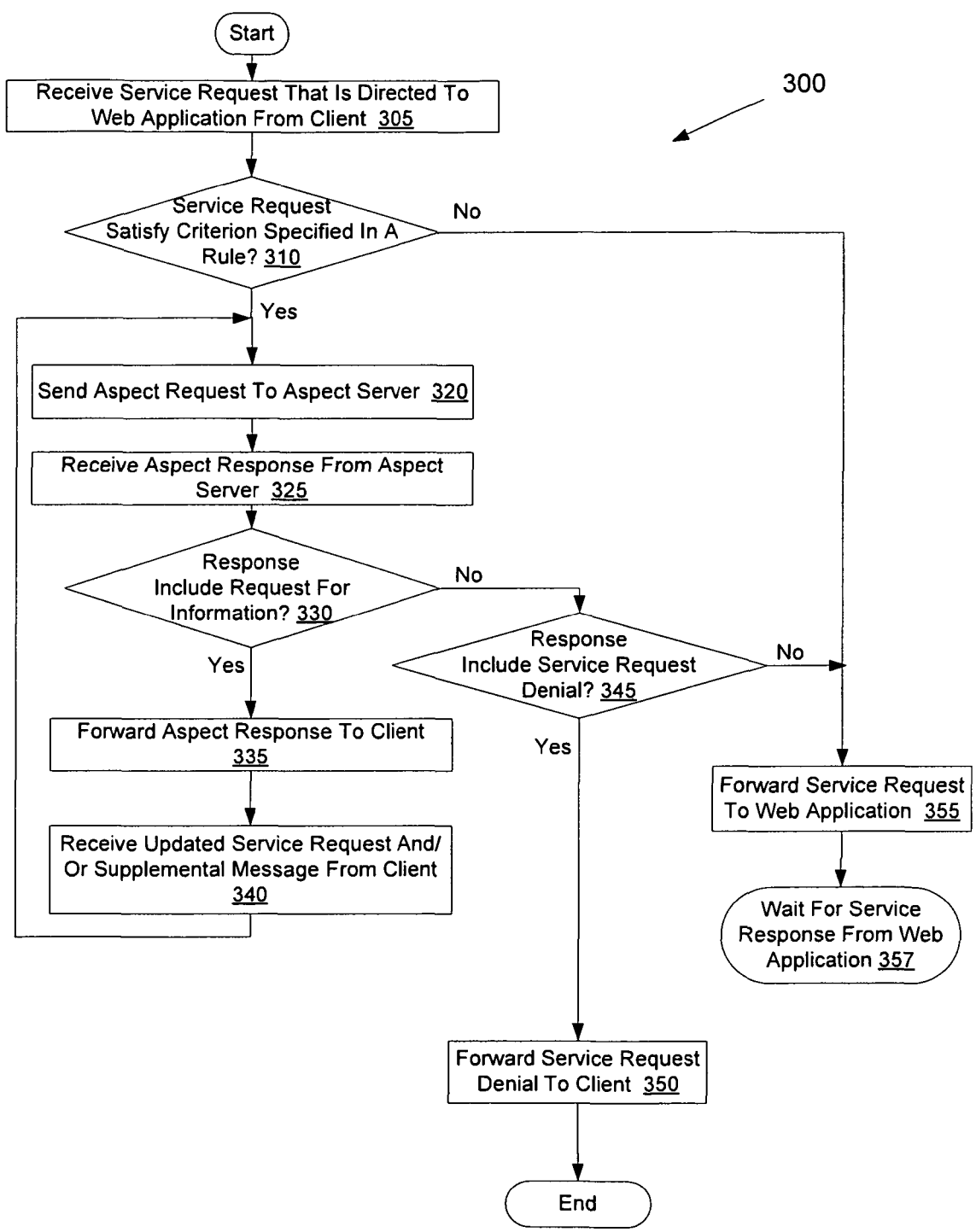
FIG. 3A is a flow diagram illustrating yet another embodiment of a method for providing aspect services.

FIG. 3A is a flow diagram illustrating yet another embodiment of a method 300 for providing aspect services. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by proxy server 110 and/or aspect server 115 of FIG. 1.

Referring to FIG. 3A, at block 305 of method 300 processing logic receives a service request. The received service request is received from a client and is addressed to a web application. At block 310, processing logic compares the service request to one or more rules using a rules engine. In one embodiment, each rule identifies an aspect service that is to be initiated if the criteria specified in the rule are satisfied. The identification of the aspect service may include a service address. If the service request satisfies criteria specified in a rule, then the method proceeds to block 320. Otherwise, the method proceeds to block 355.

At block 320, processing logic sends an aspect request to the aspect server. The aspect request specifies an aspect service to be initiated. In one embodiment, the aspect request includes the service request. Upon receipt of the aspect request, the aspect server may initiate the aspect service. The aspect service may then perform a series of operations related to a specific crosscutting concern. For example, if the aspect service is an authentication service, then it may generate an aspect response to the service request that includes a request for login and password information. Upon receiving the login and password information, the aspect service may then grant or deny access to a web application.

At block 325, processing logic receives an aspect response from the aspect server that has been generated by the aspect service. At block 330, processing logic determines whether the aspect response includes a request for additional information. For example, if the aspect service is an authentication service, then the aspect response may include a request for a login and password. In another example, the aspect service may require language and locale preferences (e.g., for an aspect that handles multilingual page rewriting or annotations). Therefore, the aspect response may include a request for a language and geographic location selection. In yet another example, an aspect service may enable commentary or forum participation on a web page or application that originally did not include such functionality. The aspect response may therefore include a request for new comments or forum posts. If the aspect response includes a request for additional information, the method proceeds to block 335. Otherwise the method proceeds to block 345.

At block 335, processing logic forwards the aspect response to the client. At block 340, processing logic receives an updated service request and/or supplemental message from the client. The updated service request and/or supplemental message may include the information that was requested in the aspect response. The method then returns to block 310.

At block 345, processing logic determines whether the aspect response includes a service request denial. A service request denial may be included, for example, if a client has failed to authenticate itself with an aspect service that includes an authentication crosscutting concern. If the aspect response includes a service request denial, the method proceeds to block 350, and the service request denial is forwarded to the client. If the aspect response does not include a service response denial (e.g., if the aspect response is a null response), then the method proceeds to block 355.

At block 355, the service request is forwarded to the web application. The aspect response may also be forwarded to the web application. Moreover, the service request may have been altered by the aspect service, and it may be a modified service request that is sent to the web application. At block 357, processing logic waits for a response from the web application. If a response is received from the web application, the method 360 of FIG. 3B may then be performed.

Figure 3B:
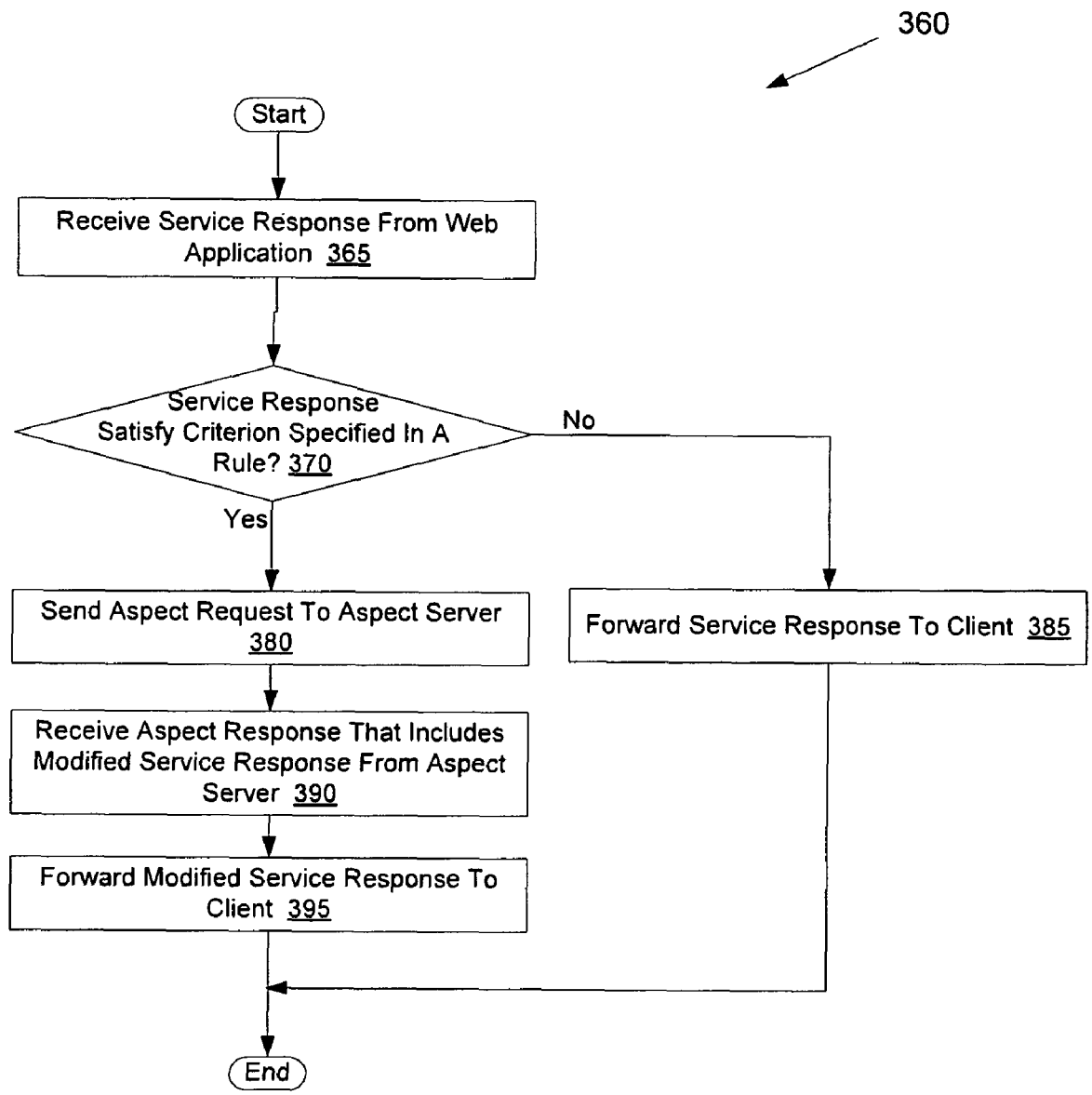
FIG. 3B is a flow diagram illustrating still yet another embodiment of a method for providing aspect services.

FIG. 3B is a flow diagram illustrating still yet another embodiment of a method 360 for providing aspect services. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 360 is performed by proxy server 110 and/or aspect server 115 of FIG. 1. Method 160 may be performed subsequent to block 357 of FIG. 3A.

Referring to FIG. 3B, at block 365 of method 360 processing logic receives a service response from a web application. At block 370, processing logic compares the service response to one or more rules using a rules engine. If the service response satisfies criteria specified in a rule, then the method proceeds to block 380. Otherwise, the method proceeds to block 385 and the service response is forwarded to a client.

At block 380, processing logic sends an aspect request to the aspect server. The aspect request specifies an aspect service to be initiated. In one embodiment, the aspect request includes the service response. Upon receipt of the aspect request, the aspect server may initiate the aspect service. The aspect service may then perform a series of operations related to a specific crosscutting concern.

At block 390, processing logic receives an aspect response from the aspect server that has been generated by the aspect service. The aspect response includes a modified service response. For example, if the aspect service is a censoring service, and the service response was a web page, then the modified service response may be a modified version of the web page in which obscene language has been removed or replaced. At block 395, processing logic forwards the modified service response to the client.

In one embodiment, in which method 360 is performed by an aspect server, blocks 380 and 390 may not be implemented. In such an embodiment the aspect service that performs the operations of a crosscutting concern may be collocated with the processing logic on the aspect server. Therefore, for example, if at block 370 the service response satisfies criteria specified in a rule the method may proceed to block 395 after the aspect service has performed the operations of the crosscutting concern.

Figure 4A:
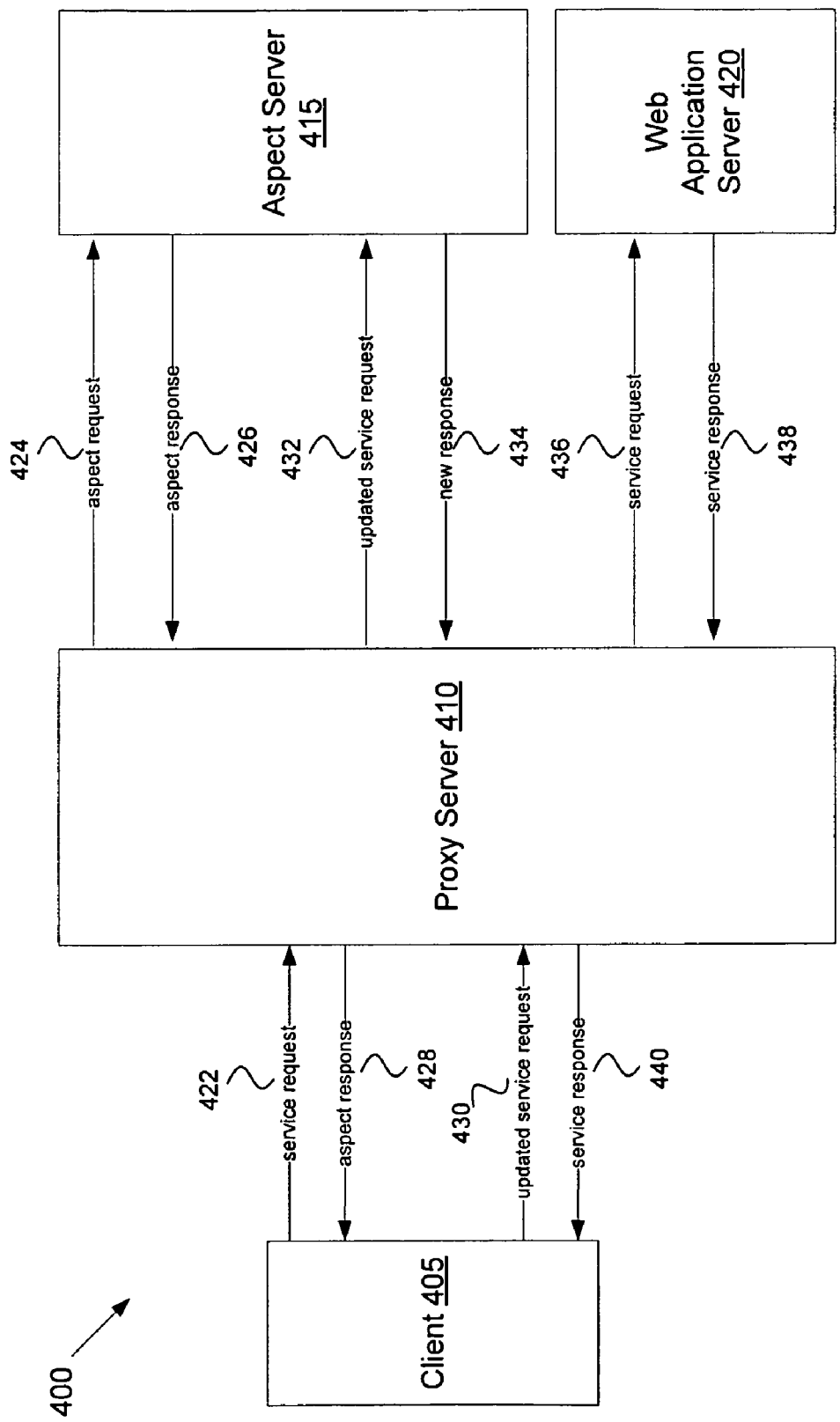
FIG. 4A illustrates a data flow diagram that shows data transmitted between a client, a proxy server, an aspect server and a web application server, in accordance with one embodiment of the present invention.

FIG. 4A illustrates a data flow diagram 400 that shows data transmitted between a client 405, a proxy server 410, an aspect server 415 and a web application server 420, in accordance with one embodiment of the present invention. In one embodiment, all transmissions are achieved using a secure channel such as, for example, secure sockets layer (SSL), secure hypertext transfer protocol (HTTPS), etc. Alternatively, an unsecure channel may be used for some or all transmissions. The data flow diagram 400 illustrates data transmissions that can be made in an embodiment of the present invention described with reference to method 300 of FIG. 3A.

In a first transmission 422, client 405 sends a service request to proxy server 410. The service request may be addressed to web application 420, and intercepted by proxy server 410, or may be addressed to proxy server 410. The service request may be, for example, a request for a web page.

Proxy server 110 may use a rules engine to analyze the service request by comparing it to multiple rules. Proxy server 110 may then generate an aspect request if the criteria specified in the rule are satisfied. In a second transmission 424, proxy server sends an aspect request to aspect server 415. The aspect request may include the service request.

Aspect server 415 initiates an aspect service identified in the aspect request, and generates an aspect response. In a third transmission 426, aspect server 415 sends the aspect response to proxy server 410. Alternatively, the third transmission 426 may be a transmission directly to client 405.

In a fourth transmission 428, proxy server 410 forwards the aspect response to client 405. Client 405 can then generate an updated service request. Alternatively, client 405 may generate a supplemental message that includes information requested by aspect server in the aspect response. In a fifth transmission 430 client 405 sends the updated service request and/or the supplemental message to proxy server 410. Alternatively, client 405 may send the supplemental message and/or updated service request directly to aspect server 415.

In a sixth transmission 432, proxy server 410 sends the updated service request and or the supplemental message to aspect server 415. The aspect service may then process the information included in the supplemental message and or the updated service request. Aspect server 415 may then generate a new response and send the new response to proxy server 410 in a seventh transmission 434.

Proxy server 410 then sends an eighth transmission 436 to web application server 420 that includes the service request and/or the updated service request. Web application server 420 processes the surface request and/or the updated service request and generates a service response. The service response is sent to proxy server 410 in a ninth transmission 438. Proxy server 410 then forwards the service response to the client 405 in a tenth transmission 440.

Figure 4B:
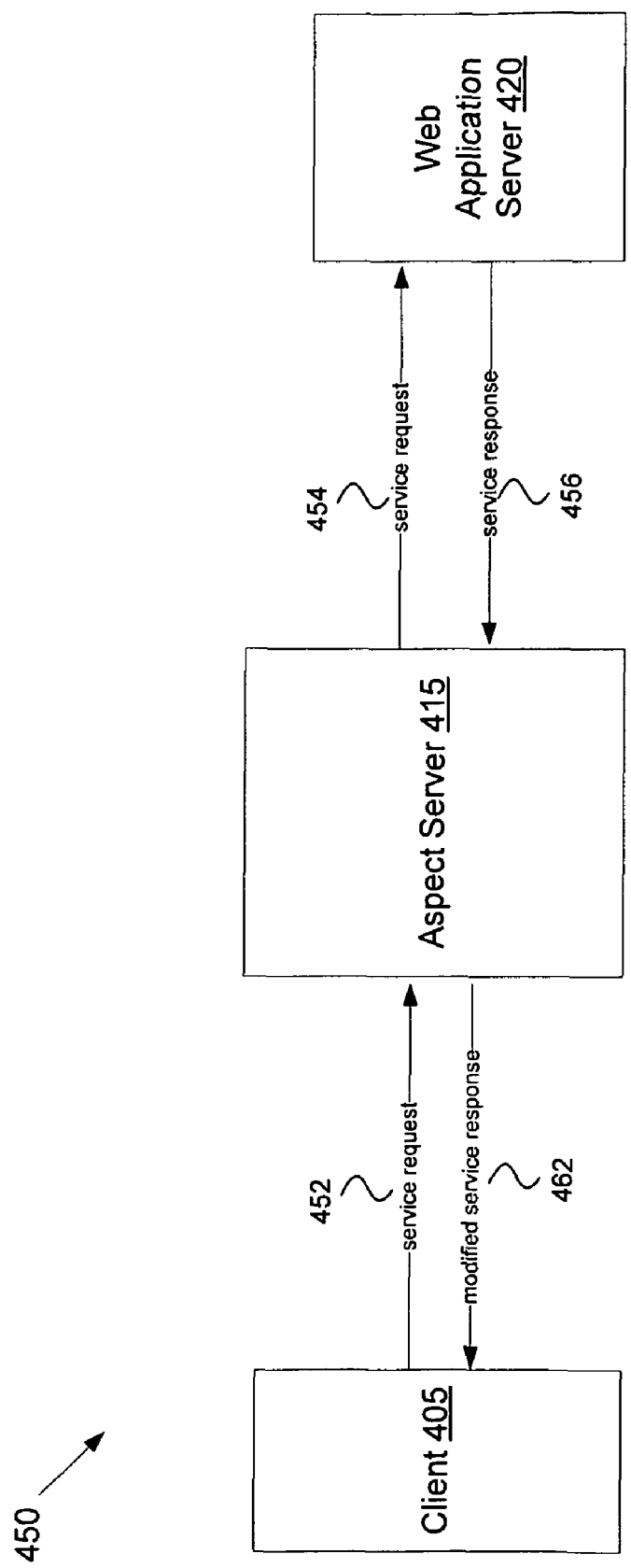
FIG. 4B illustrates a data flow diagram that shows data transmitted between a client, an aspect server and a web application server, in accordance with another embodiment of the present invention.

FIG. 4B illustrates a data flow diagram 450 that shows data transmitted between a client 405, an aspect server 415 and a web application server 420, in accordance with another embodiment of the present invention. The data flow diagram 450 illustrates data transmissions that can be made in an embodiment of the present invention described with reference to method 300 of FIG. 3A and/or method 360 of FIG. 3B.

In a first transmission 452, client 405 sends a service request to aspect server 415. The service request may be addressed to web application 420 and intercepted by aspect server 415, or may be addressed to aspect server 415.

Aspect server 415 may use a rules engine to analyze the service request by comparing it to multiple rules. If the service request matches criteria specified in a rule, then aspect server 415 may initiate an aspect service identified in the rule. Aspect server 415 then forwards the service request to web application server 420 in a second transmission 454. Web application server 420 processes the service request and generates a service response. Web application server 420 then sends the service response to aspect server 415 in a third transmission 456.

Aspect server may use the rules engine to analyze the service response by comparing it to multiple rules. If the service response matches criteria in a rule, aspect server may initiate an aspect service identified in the rule. In one embodiment, the aspect service modifies the service response. Aspect server 415 then sends the modified service response to the client 405 in a fourth transmission 462.

Figure 5:
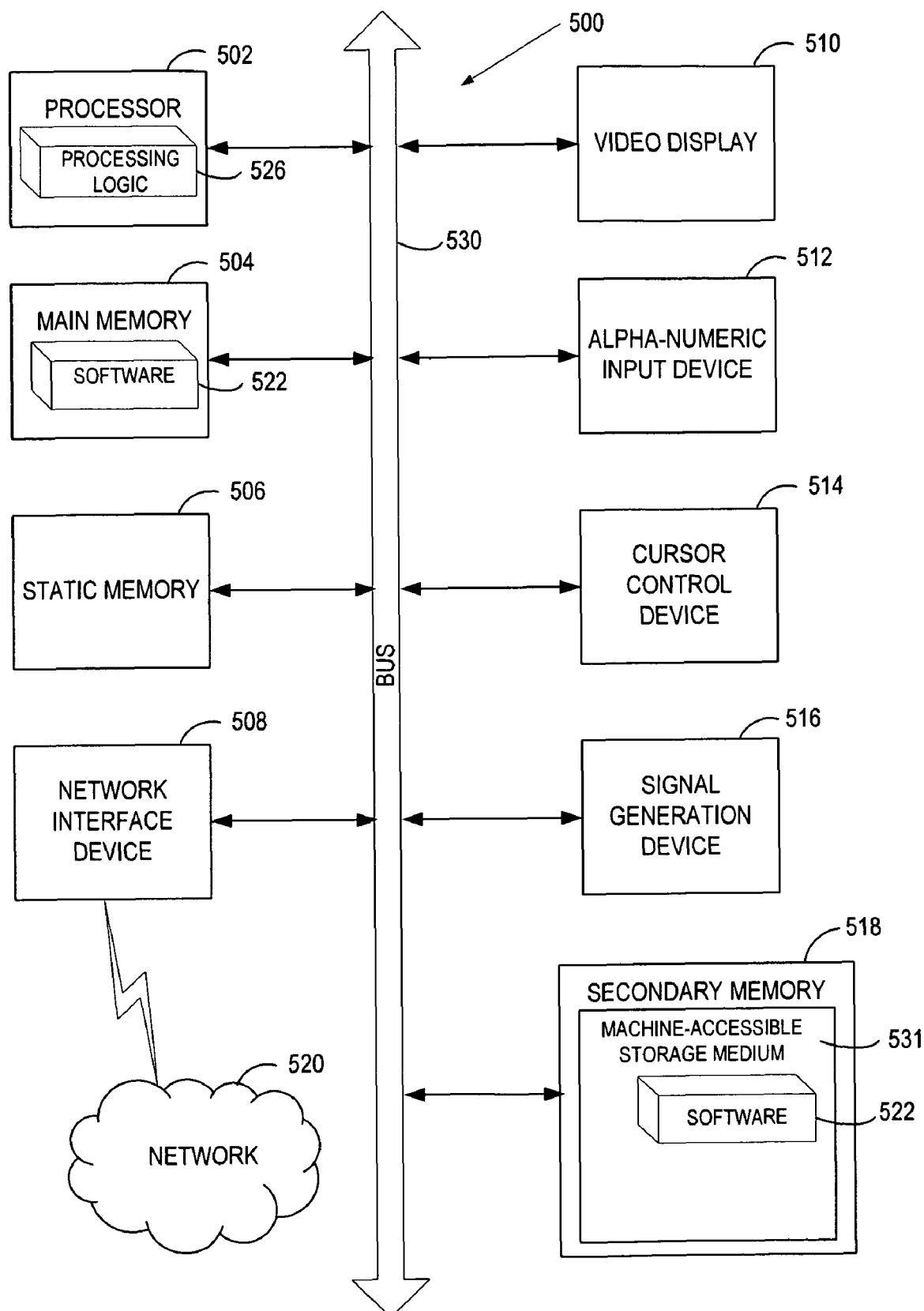
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the rules engine 130, rules 165 and/or aspect services (e.g., first aspect service 135 and second aspect service 140) of FIG. 1A, and/or a software library containing methods that call the rules engine 130, rules 165 and/or aspect services. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method for an aspect server, comprising:
   receiving, from a proxy server remote from the aspect server, an aspect request associated with a web application, the web application being hosted by a web application server that is remote from the aspect server and the proxy server;
   performing, by a computer system executing the aspect server, operations according to the aspect request, the operations being associated with a crosscutting concern; and
   returning a result, the result supplementing functionality of the web application.

2. The method of claim 1, wherein the operations are associated with at least one of a logging concern, a security concern, an authentication concern, a database transaction concern, or a parameter validation concern.

3. The method of claim 1, wherein the aspects are provided as a service to the web application.

4. The method of claim 1, wherein the proxy server uses a rule engine to determine whether or not to forward a service request to the aspect server.

5. The method of claim 1, wherein the result is sent to the proxy server, the web application server or a client.

6. A computer implemented method comprising:
   receiving, by a computer system executing a proxy server, a service request from a client, the service request being directed to a web application, wherein a core concern of the web application is configured to perform a core operation upon receiving the service request;
   sending, by the computer system, which is remote from the web application, an aspect request to an aspect server that is remote from the web application and the computer system, wherein the aspect server hosts an aspect service that performs an additional operation before or after the core operation is performed, wherein the additional operation adds functionality to the core concern;
   receiving an aspect response from the aspect server after the aspect service has performed the additional operation; and
   performing at least one of forwarding the aspect response to the client or forwarding the service request to the web application.

7. The method of claim 6, further comprising:
   receiving a service response from the web application; and
   forwarding the service response to the aspect server, wherein the service response is included in the aspect request.

8. The method of claim 7, further comprising:
   receiving a modified service response from the aspect server, wherein the service response has been modified by the aspect service to create the modified service response; and
   forwarding the modified service response to the client.

9. The method of claim 6, wherein the aspect request includes the service request, and wherein the aspect service modifies the service request before it is sent to the web application.

10. The method of claim 6, further comprising:
    determining whether to send the aspect request to the aspect server.

11. A system comprising:
    an application server to host a web application, the web application having a core concern, wherein the core concern includes a set of behaviors that are core to functionality of the web application;
    an aspect server, remote from and networked with the application server, to host an aspect service configured to apply a crosscutting concern, wherein the crosscutting concern includes a set of behaviors that add functionality to the core concern of the web application; and
    a proxy server, remote from and networked with the application server and the aspect server, to send an aspect request to the aspect server;
    wherein the aspect server is configured to execute the aspect service upon receiving the aspect request.

12. The system of claim 11, wherein the proxy server is also networked with a client, and is further to receive a service request from the client, the service request being directed to the web application, to send the aspect request to the aspect server after receiving the service request, to receive an aspect response from the aspect server after the aspect server has executed the aspect service, and to perform at least one of forwarding the aspect response to the client or forwarding the service request to the application server.

13. The system of claim 12, further comprising:
the proxy server to receive an updated service request from the client, to forward the updated service request to the aspect server, to receive a new response from the aspect server, and to forward the updated service request to the web application.

14. The system of claim 12, further comprising:
the proxy server to receive a service response from the application server, to forward the service response to the aspect server, to receive a modified service response from the aspect server, wherein the service response has been modified by the aspect service, and to forward the modified service response to the client.

15. The system of claim 12, wherein the service request is forwarded to the aspect server along with the aspect request and the aspect service modifies the service request before it is sent to the web application.

16. A computer readable storage medium including instructions that, when executed by a processing system, cause the processing system to perform a method for an aspect server, comprising:
receiving, from a proxy server remote from the aspect server, an aspect request associated with a web application, the web application being hosted by a web application server that is remote from the aspect server and the proxy server;
performing, by the processing system, executing the aspect server, operations according to the aspect request, the operations being associated with a crosscutting concern; and
returning a result, the result supplementing functionality of the web application.

17. The computer readable storage medium of claim 16, wherein the operations are associated with at least one of a logging concern, a security concern, an authentication concern, a database transaction concern, or a parameter validation concern.

18. The computer readable storage medium of claim 16, wherein the aspects are provided as a service to the web application.

19. The computer readable storage medium of claim 16, wherein the result is sent to the proxy server, the web application server or a client.

20. A computer readable storage medium including instructions that, when executed by a computer system, cause the computer system to perform a method comprising:
receiving, by the computer system executing a proxy server, a service request from a client, the service request being directed to a web application, wherein a core concern of the web application is configured to perform a core operation upon receiving the service request;
sending, by the computer system, which is remote from the web application, an aspect request to an aspect server that is remote from the web application and the computer system, wherein the aspect server hosts an aspect service that performs an additional operation before or after the core operation is performed, wherein the additional operation adds functionality to the core concern;
receiving an aspect response from the aspect server after the aspect service has performed the additional operation; and
performing at least one of forwarding the aspect response to the client or forwarding the service request to the web application.

21. The computer readable storage medium of claim 20, further comprising:
receiving a service response from the web application; and
forwarding the service response to the aspect server, wherein the service response is included in the aspect request.

22. The computer readable storage medium of claim 21, further comprising:
receiving a modified service response from the aspect server, wherein the service response has been modified by the aspect service to create the modified service response; and
forwarding the modified service response to the client.

23. The computer readable storage medium of claim 20, wherein the aspect request includes the service request, and wherein the aspect service modifies the service request before it is sent to the web application.

* * * * *